United States Patent Office 3,737,320

Patented June 5, 1973

3,737,320 PHOTOPOLYMERIZABLE COPYING COMPOSITION

Roland Dietrich, Wiesbaden-Biebrich, Germany, assignor to Kalle Aktiengesellschaft, Wiesbaden-Biebrich, Germany No Drawing. Filed Dec. 7, 1971, Ser. No. 205,701
Claims priority, application Germany, Dec. 9, 1970, P 20 60 576.9
Int. Cl. G03c *1/68*
U.S. Cl. 96—115 P 11 Claims

ABSTRACT OF THE DISCLOSURE

This invention relates to a photopolymerizable copying composition comprising at least one binder, at least one polymerizable vinyl or vinylidene compound and, as a photoinitiator, at least one compound of the general formula $$R—C{\equiv}C—CO—R'$$

wherein

R is selected from the group consisting of an alkyl group having 1 to 8 carbon atoms or an aryl group having 6 to 10 carbon atoms, and R' is selected from the group consisting of an aryl group having 6 to 10 carbon atoms or an aralkenyl group having 8 to 12 carbon atoms.

This invention relates to a new photopolymerizable copying composition which may be in liquid form or in the form of a solid layer on a support and which contains as the essential constituents at least one binder, at least one polymerizable vinyl or vinylidene compound, and at least one photoinitiator.

Known photoinitiators for the photopolymerization of unsaturated compounds are, for example, hydrazones, five-membered nitrogen-containing heterocycles, mercapto compounds, pyrylium or thiopyrylium salts, polynuclear quinones, synergistic mixtures of various ketones, and dyestuff/oxidation reduction systems.

A disadvantage of the majority of these compounds is that they are suitable only for certain light-sensitive layers. Their relatively low activity is just sufficient in most cases for the photo-cross-linkage of unsaturated high molecular weight binders, e.g. of polyvinyl cinnamate or of the acrylated epoxy resins described in U.S. Pat. No. 3,427,161, but usually is not suitable for photopolymerization of low molecular weight vinyl compounds.

Other photoinitiators, e.g. those mentioned in Dutch patent application No. 6715856, require the addition of suitable dye sensitizers for increasing their light-sensitivity. The same applies to the hydrazones cited in German Offenlegungsschrift No. 1,495,973 which, furthermore, are unstable and thus unsuitable for the production of storable layers.

The dyestuff/oxidation reduction system described in U.S. Pat. No. 3,097,096, is suitable only for solutions or in combination with water-soluble colloids as binders. The jellies resulting upon exposure to light, however, are not suitable for the production of efficient printing forms since their cross-linkage density is too low and their surface is too hydrophilic.

The photoinitiators used heretofore preferably have been certain anthraquinone derivatives. These compounds, too, have various disadvantages, however. They have very high melting points, are usually very difficultly soluble and thus can be incorporated into the copying layers to only a limited extent without crystallization occurring. Even if clear layers are obtained, storage under severe conditions (slightly elevated temperature and air humidity) causes the formation of crystallites in the layers, which adversely affect the quality of the copying layers. This is accompanied in many cases by a poor compatibility with the other layer constituents, which, upon storage, leads to a gradual disintegration or "exudation" from the binder matrix. The initiator molecules are thereby enriched on the surface of the material and, upon exposure to light, insufficient cross-linkage occurs in the deeper layer areas.

The two described effects are intensified particularly by the fact that, with these known initiators, the intensity of cross-linkage markedly increases within wide limits with the concentration of the initiator. Particularly in the case of more favorable, higher initiator concentrations, the troubles are more pronounced, of course.

The present invention provides new photoinitiators which do not have these disadvantages.

The present invention provides a photopolymerizable copying composition which contains, as the essential constituents, at least one binder, at least one polymerizable vinyl or vinylidene compound, and at least one photoinitiator. The photoinitiator is at least one compound of the general formula:

$$R—C{\equiv}C—CO—R'$$

wherein

R is an alkyl group with 1 to 8 carbon atoms or an aryl group with 6 to 10 carbon atoms, and R' is an aryl group with 6 to 10 carbon atoms or an aralkenyl group with 8 to 12 carbon atoms.

The copying composition of the invention can be utilized commercially in the form of a solution or dispersion, e.g. as a so-called photoresist composition, which is applied by the user himself to an individual support, e.g. for chemical milling, for the production of printed circuits, stencils, sign boards, screen printing forms, and the like, and, after drying, is exposed and developed to give an imagewise distributed layer.

The copying composition also may be marketed particularly in the form of a solid photopolymerizable layer on a support as a light-sensitive copying material for the production of printing forms, relief imgaes, etch resists, stencils, matrices, screen printing forms, color proofing films, single copies, and the like. An important field of application is especially the production of printing plates presensitized for storage for planographic, relief, and intaglio printing.

The group R in the initiators used in accordance with the invention may be, for example, a methyl, ethyl, isopropyl, n-butyl, n-hexyl, 3,5-dimethyl-hexyl, 4-chloro-n-pentyl, or 3-methoxy-n-propyl group or a phenyl, p-tolyl, 3-ethyl-phenyl, 2-chloro-phenyl, 3,4-dimethoxy-phenyl, 4-ethoxy-phenyl, 3-isobutoxy-phenyl, 3,4-methylenedioxy-phenyl, 2,3-ethylenedioxy-phenyl, 4-bromo-phenyl, 4-nitro-phenyl, or 4-methoxy-naphthyl-(1) group or the like. R preferably is a monouclear aryl group.

R' may be an aryl group of the type indicated for R or, for example, a styryl, p-chloro-styryl, 2,4-dimethoxy-styryl, 3-phenyl-propen-(1)-yl group or the like.

Those compounds have proved particularly active in which R is a mononuclear aryl group and at least one of the groups R and R' includes at least one alkoxy or alkylene dioxy group.

The compounds used in accordance with the invention are known as such and may be synthesized according to various processes, e.g. by reaction of lithium phenyl acetylide with aromatic acid chlorides [Liebigs Ann. 308, 276 (1899)] or of β-bromo-styryl-aryl ketones with soda lye [J. Amer. Chem. Soc. 69, 2134 (1947)]. The easiest way is the reaction of aryl ethinyl magnesium bromide with aromatic aldehydes [Pr. Indiana Acad. 50, 87 et seq. (1940)] and oxidation of the resulting secondary alcohol into the ketone [J. Chem. Soc. (London) 1946, 39 et seq.]. The yields are satisfactory.

The compounds are very readily soluble in all common solvents and have low melting points, often slightly above room temperature. The crystallization tendency is very low and, in the solid layers, even absent. The miscibility and compatibility with the various resin constituents of the binder matrix is good.

Furthermore, in the case of the initiators used in accordance with the invention, particularly in the case of the preferred representatives, the optimum initiator quantity in relationship to the quantity of the monomer is substantially lower for many conventional layer combinations than in the case of the hitherto conventional and preferred initiators, i.e. photopolymers are formed which, on an average, have a higher chain length.

Because of the small quantity of initiator required and the good layer compatibility, the copying layers prepared therewith tend neither to diffusion of the initiator nor to the formation of any crystal nuclei, even upon severe storage conditions over long periods of time.

As binders, there may be used various resins, preferably those which are soluble or swellable in aqueous alkaline solutions so that the developability of the copying layer with weakly alkaline solutions is thus guaranteed. It is also possible, however, to use resins insoluble in aqueous alkali and to remove the non-cross-linked areas of the layer by means of solvents or solvent-containing aqueous solutions.

The addition of small quantities of alkali-insoluble resins has proved suitable for adjusting certain layer properties, such as solubility, flexibility, anchorage, abrasion resistance, and the like.

Suitable alkali-soluble resins are, for example, copolymers of styrene and maleic anhydride, copolymers of vinyl acetate and crotonic acid, cellulose hydrogen phthalates, copolymers of methacrylic acid and methyl methacrylate, furthermore commercial terpolymers, such as those of vinyl acetate, vinyl chloride, and maleic acid, and the like.

Alkali-insoluble resins which have proved useful as additions are, for example, polystyrenes, copolymers of styrene and vinyl toluene, polyvinyl acetates, cellulose acetates, cellulose acetate butyrates, alkyd resins, chlorodiphenyl resins, ethyl celluloses, and the like.

The polymerizable vinyl or vinylidene compounds used in the copying compositions in accordance with the invention are primarily the acrylic and methacrylic esters known and conventional for this purpose, e.g. butyl acrylate, glycidyl acrylate, octyl acrylate, ethylene glyol dimethacrylate, polyethylene glycol diacrylate and polyethylene glycol dimethacrylate, trimethylol ethane trimethacrylate, trimethylol propane triacrylate and trimethylol propane trimethacrylate, neopentyl glycol dimethacrylate, acrylates and methacrylates of pentaerythritol, and the like.

Particularly preferred are those representatives which contain the polymerizable group several times so that branching and cross-linkage of the forming polymer occurs. The monomers may be present either alone or with others in the layer. Under normal conditions, they are usually liquid; their portion of the layer weight may be considerable, however.

The initiators used in accordance with the invention also may be used either alone or simultaneously with others, e.g. in order to profit from synergistic effects. The usually employed quantities are in the range from about 0.01 to 8 percent, calculated on the solids content of the copying composition. Preferably, they are in the lower part of this range.

The light-sensitivity of the copying compositions may be further increased by the addition of substances which, together with the initiator, more effectively utilize the irradiated quantity of light, i.e. are effective as sensitizers. As such, there have proved particularly suitable a number of heterocyclic compounds which result from substitution of cyclic systems with two or more heteratoms by radicals with an electron donor effect. These compounds are known as photoconductors from U.S. Pat. No. 3,257,204. Suitable representatives of such compounds, such as diazoles, triazoles, oxazoles, oxidazoles or thiazoles, are 2,5-bis-(4-dimethylaminophenyl)-oxidazole and 2 - (4 - diethylamino-phenyl)-phenanthro - (9,10) - 4,5-oxazole, for example. It is also possible to use conventional sensitizing dyes, such as cyanines, merocyanines, triphenyl methane dyes, and the like.

Suitable hydrogen donors may be further added to the layers. Such compounds are, for example, glycols, polyglycols, glycol ethers and esters, ethylene oxide adducts, and the like.

For avoiding premature polymerization in the dark upon storage of the material, it is possible to add to the layers small quantities of inhibitors, particularly derivatives of hydroquinone or phenols.

Depending on the substitution, the initiators used in accordance with the invention have absorption maxima in the ultraviolet spectral range which are of the order of 300 to 340 nm. with a second band of low to very low intensity which extends towards the visible range. Exposure of the light-sensitive materials of the invention thus may be performed with the lamp types conventional in the reproduction field, e.g. with carbon arc lamps, tubular exposure devices or high-pressure mercury burners. The spectral emission of xenon lamps which find general use xenon copying apparatus, requiring substantially no maintenance, has proved suitable.

The above-described light-sensitive copying composition may have technical application in many fields. Applied to suitable support materials of metal, film or paper, it may serve for the production of printing forms for offset printing. Applied to suitable metal supports, it may also serve for the production of etching blocks, e.g. of zinc, in that the polymer image areas during etching, protect the metal beneath from the attack of the etching medium.

When greater layer thicknesses are used than in the case of the offset material and when the relationship of the initiator quantity to the monomer content is suitable, it is also possible to produce a printing form suitable for relief printing.

The following exemplary embodiments further illustrate the invention. If not stated otherwise, percentages are by weight; 1 part by volume is 1 ml. if 1 part by weight is 1 g.

EXAMPLE 1

30 mg. of hexin-(1)-yl-p-tolyl ketone (No. 8 of the table at the end of the specification) are dissolved in a small quartz flask in 2 ml. of pure triethylene glycol diacrylate, rinsed for 1 minute with pure dry nitrogen and the flask is closed. Then, with slight external cooling by means of cold water, it is exposed to the light of a carbon arc lamp (2 carbons, 18 amperes, distance lamp rim/flask: 35 cm.). After 15 seconds, the content of the flask is completely polymerized.

EXAMPLE 2

10 mg. of 3,4-dimethoxy-phenyl-phenethinyl ketone (compound No. 4) are exposed in the same manner in a small quartz flask of the described type or a thin-walled test tube, the monomer used being trimethylol propane triacrylate. After 20 seconds, the content is solidified in the form of a jelly.

The tests may also be carried out similarly with the other representatives, e.g. compound No. 1 or No. 2 or the table. The times vary somewhat but otherwise the same results are obtained.

EXAMPLE 3

A coating solution is prepared which contains 25 parts by weight of 4-methoxy-phenyl-phenethinyl ketone (compound No. 3 following), 200 parts by weight of a copolymer of styrene and maleic anhydride, having an average molecular weight of about 20,000, an acid number of 180 and a decomposition temperature of about 210° C.,
200 parts by weight of a copolymer of α-methyl-styrene and vinyl toluene (Piccotex®),
35 parts by weight of cellulose acetate butyrate (24 percent of acetic acid, 42.5 percent of butyric acid, K value 50),
2 parts by weight of p-methoxy-phenol,
450 parts by weight of trimethylol propane triacrylate,
50 parts by weight of triethylene glycol, and
7,000 parts by volume of butanone.

The above clear filtered solution is applied on a conventional whirler, serving for plate coating and rotating at about 120 r.p.m., to a printing support of aluminum the surface of which has been roughened by mechanical brushing to form a thin and uniform layer. After drying, the layer is provided with a thin film of polyvinyl alcohol to protect it from too rapid diffusion of atmospheric oxygen, which film is also uniformly dried. The resulting layer weight is 4.8 g./m.². The photopolymer printing plate thus produced is exposed for 4 minutes under a negative original to a xenon copying device (380 volts, 25 amperes, distance lamp/plate: 70 cm.). For removing the non-image areas, the plate is then briefly treated with a percent solution of disodium phosphate in water. After rinsing with water, it may be wiped over with a hydrophilizing medium, e.g. highly diluted phosphoric acid. The printing support shows a reflection polymer image and, after inking up with greasy printing ink, it can be used for printing long runs in an offset printing machine.

EXAMPLE 4

Similarly as described in Example 3, a solution of 40 parts by weight of phenethinyl-(3,4-methylenedioxy-phenyl)-ketone (compound No. 5 below),
400 parts by weight of the copolymer, used in Example 3, of styrene and maleic anhydride,
50 parts by weight of polyvinyl caetate (molecular weight: 250,000),
2 parts by weight of 2,6-di-tert.-butyl-p-cresol,
450 parts by weight of trimethylol propane triacrylate,
50 parts by weight of polyethylene glycol (molecular weight about 750), and
9,000 parts by volume of butanone is applied to an electrochemically roughened thin support of aluminum, which after drying is provided with a coating of polyvinyl alcohol and is again dried. A layer thickness of 4.3 g./m.² is obtained. Exposure to a xenon copying device is carried out for 2 minutes under a negative screen original, similarly as described in Example 3. Development of the printing foil is performed for 1½ minutes with a 0.5 percent aqueous solution of trisodium phosphate. After conventional hydrophilizing with highly diluted phosphoric acid solution and inking up with printing ink, the offset printing form is ready for printing. The attainable printing runs are longer than in the preceding example.

EXAMPLE 5

To an electrochemically roughened aluminum printing support provided with an about 2μ thick Eloxal layer, the following solution is applied in the manner described in the two preceding examples:

15 parts by weight of phenethinyl-(3,4-dimethoxy-phenyl)-ketone (compound No. 4 below),
15 parts by weight of phenethinyl-styryl ketone (compound No. 7 below),
400 parts by eweight of the copolymer of styrene and maleic anhydride used in Example 3,
50 parts by weight of polymethyl methacrylate (molecular weight below 100,000, softening point 114 to 116° C.), 500 parts by weight of trimethylol propane triacrylate, and
2 parts by weight of p-methoxyphenol in
8,000 parts by volume of butanone.

An exposure time of 2 minutes, to a xenon lamp as described above, produces a wedge length of 8 steps when using a conventional 21-step Kodak step wedge and when developing the printing foil with a solution of 2 percent of trisodium phosphate in water for 1½ minutes.

The abrasion resistance during printing and thus the degree of cross-linkage and anchorage to the support achieved by lights are markedly higher in the case of this printing form than in the preceding examples.

EXAMPLE 6

A commercial polyester film provided on one side with a subsequently hardened coating of a white pigment in a hydrophilic binder is sensitized, as described in Example 3, with a solution containing 25 parts by weight of phenethinyl-(3,4-dimethoxy-phenyl)-ketone (compound No. 4 below),
400 parts by weight of the copolymer of styrene and maleic anhydride used in Example 3,
50 parts by weight of the polymethyl methacrylate used in Example 5,
500 parts by weight of trimethylol propane triacrylate, and
2 parts by weight of 2,6-di-t-butyl-p-cresol in
5,000 parts by volume of butanone.

The film is dried as described above, provided with a coating of polyvinyl alcohol and then exposed for 90 seconds to the xenon lamp under a suitable negative original and treated, as described above. Development is performed with a 2 percent aqueous solution of trisodium phosphate and, after a brief wiping over with a suitable olephilic ink, a clean black or colored image is obtained on a purely white background. Development, hydrophilizing and application of the ink may be performed very simply in a combined processing apparatus with roller application. The copy obtained may be used directly for special purposes, but also may be used as a printing form for making further copies.

EXAMPLE 7

A polyester film of the type described in Example 6 is coated with the same solution with the exception that, instead of compound No. 4, compound No. 5 below [phenethinyl-(3,4-methylenedioxy-phenyl)-ketone] is used in the same quantity.

Subsequent to the described automatic development and hydrophilization, in the present case a saturated aqueous methyl violet solution is applied to the film by means of plush rolls instead of inking it up with olephilic ink. The non-image areas of the film are thus deeply colored and—if a positive original is used for exposure—a deeply colored positive image is obtained on a colorless background polymerized similarly to a lacquer.

EXAMPLE 8

When 25 mg. of crystal violet (Colour Index No. 42555) or pararosaniline (Colour Index No. 42500) are added to the sensitizing solution described in Example 6, using a negative original for exposure and inking with olephilic ink is eliminated, deep blue or red glossy extraordinarily abrasion-resistant copies of the original are obtained which include the dye in a water-resistant form.

EXAMPLE 9

A clear filtered solution of 40 parts by weight of phenethinyl-phenyl ketone (compound No. 1 below),
200 parts by weight of the copolymer of styrene and maleic anhydride used in Example 3,
200 parts by weight of the copolymer of α-methyl styrene and vinyl toluene used in Example 3,
40 parts by weight of cellulose acetate butyrate (24 percent of acetic acid, 42.5 percent of butyric acid, K value 90),
500 parts by weight of trimethylol propane triacrylate, and
2 parts by weight of 2,6-di-t-butyl-p-cresol in
7,000 parts by volume of butanone is uniformly applied by means of a plate whirler to a thoroughly degreased zinc plate suitable for powderless etching, dried and provided with a thin coating of polyvinyl alcohol. Exposure is carried out for 5 to 7 minutes by means of the xenon lamp under a negative screen original. In a subsequent developing step of 1 minute, the non-image areas are removed by means of an aqueous solution of 0.5 percent of trisodium phosphate. For imparting further increased layer resistance to the plate, it is posisible to include a heating step but it is not necessary.

In a machine for powderless etching, the zinc plate is then etched, in known manner, with nitric acid containing an edge protecting agent. The relief printing form thus obtained has an excellent layer adhesion and etching resistance in the image areas, also in the fine portions of the screen, and can be used for long printing runs, if desired after treatment with a solvent for removing residual layer portions.

EXAMPLE 10

A clear filtered sensitizing solution of 30 parts by weight of phenethinyl-(3,4-dimethoxy-phenyl)-ketone (compound No. 4 below),
350 parts by weight of the copolymer of styrene and maleic anhydride used in Example 3,
100 parts by weight of the copolymer of α-methyl styrene and vinyl toluene used in Example 3,
25 parts by weight of polyvinyl butyral with about 77 percent of vinyl butyral, about 2 percent of vinyl acetate, and about 21 percent of vinyl alcohol units, having an average molecular weight of about 32,000,
500 parts by weight of trimethylol propane triacrylate, and
2 parts by weight of p-methoxyphenol in
7,000 parts by volume of butanone is applied in a darkened room by means of a plate whirler, to a suitable flat support of a phenoplast composite material, which has ben provided with a thin superficial layer of copper. The copying material, dried in the conventional manner and provided with a thin coating of polyvinyl alcohol, is then exposed for 5 minutes under a negative original of an electric circuit using a copying apparatus of the type described in Example 3. Development is performed for 1 minute with a solution of 0.5 percent of trisodium phosphate in water. After a brief rinsing with water, the copper layer now bared in the non-image areas is etched away by treatment with at 35 percent iron-III-chloride solution. After decoating with a solvent, a clean metallic conductive path, true to the original, is obtained on the electrically insulating support, which can be used as a print circuit.

The following table summarizes the examples of the tested initiators used in accordance with the invention.

TABLE

| Compound No. | R | R' |
|---|---|---|
| 1 | Phenyl | Phenyl. |
| 2 | do | p-Tolyl. |
| 3 | do | p-Methoxy-phenyl. |
| 4 | do | 3,4-Dimethoxy-phenyl. |
| 5 | do | 3,4-Methylenedioxy-phenyl. |
| 6 | do | p-Nitro-phenyl. |
| 7 | do | Styryl. |
| 8 | n-Butyl | p-Tolyl. |

It will be obvious to those skilled in the art that many modifications may be made within the scope of the present invention without departing from the spirit thereof, and the invention includes all such modifications.

What is claimed is:

1. A photopolymerizable copying composition comprising at least one binder, at least one polymerizable vinyl or vinylidene compound and, as a photoinitiator, at least one compound of the general formula $$R—C\equiv C—CO—R'$$

wherein

R is selected from the group consisting of an alkyl group having 1 to 8 carbon atoms or an aryl group having 6 to 10 carbon atoms, and R' is selected from the group consisting of an aryl group having 6 to 10 carbon atoms or an aralkenyl group having 8 to 12 carbon atoms.

2. A copying composition according to claim 1 in which R is a mononuclear aryl group.

3. A copying composition according to claim 2 in which at least one of the groups R and R' has at least one alkoxy or alkylene dioxy group.

4. A copying composition according to claim 1 in the form of a solid light-sensitive layer on a support.

5. A copying composition according to claim 1 including a binder soluble or softenable in alkali.

6. A copying composition according to claim 1 in which the photoinitiator is hexin-(1)-yl-p-tolyl ketone.

7. A copying composition according to claim 1 in which the photoinitiator is 3,4 - dimethoxy-phenyl-phenethinyl ketone.

8. A copying composition according to claim 1 in which the photoiniator is 4-methoxy-phenyl-phenethinyl ketone.

9. A copying composition according to claim 1 in which the photoinitiator is phenethinyl-(3,4 - methylenedioxy-phenyl)-ketone.

10. A copying composition according to claim 1 in which the photoinitiator is phenethinyl-styryl ketone.

11. A copying composition according to claim 1 in which the photoinitiator is phenethinyl-phenyl ketone.

References Cited

UNITED STATES PATENTS 3,652,275 3/1972 Baum et al. ........ 96—115 P

RONALD H. SMITH, Primary Examiner

U.S. Cl. X.R.

96—35.1; 204—159.23